US010055622B1

(12) United States Patent
Jiang et al.

(10) Patent No.: US 10,055,622 B1
(45) Date of Patent: Aug. 21, 2018

(54) FAST RFID TAG IDENTIFYING METHOD

(71) Applicant: National Central University, Jhongli (TW)

(72) Inventors: Jehn-Ruey Jiang, Hsinchu (TW); Ming-Kuei Yeh, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 15/592,754

(22) Filed: May 11, 2017

(30) Foreign Application Priority Data

Mar. 28, 2017 (TW) .............................. 106110289 A

(51) Int. Cl.
*G06K 7/08* (2006.01)
*G06K 19/06* (2006.01)
*G06K 7/10* (2006.01)

(52) U.S. Cl.
CPC ............................... *G06K 7/10366* (2013.01)

(58) Field of Classification Search
USPC .................................. 235/383, 385, 451, 492
See application file for complete search history.

(56) References Cited

U.S. PATENT DOCUMENTS

| 2002/0024421 | A1* | 2/2002 | Kang | G06K 7/0008 340/10.2 |
| 2003/0019929 | A1* | 1/2003 | Stewart | G06K 7/0008 235/385 |
| 2003/0137403 | A1* | 7/2003 | Carrender | G06K 7/0008 340/10.4 |
| 2006/0290508 | A1* | 12/2006 | Moutchkaev | G06K 7/0008 340/572.1 |
| 2007/0228833 | A1* | 10/2007 | Stevens | H02J 5/005 307/45 |
| 2008/0180288 | A1* | 7/2008 | Lee | H03M 9/00 341/100 |
| 2009/0058614 | A1* | 3/2009 | Roz | H04B 5/00 340/10.4 |
| 2010/0066505 | A1* | 3/2010 | Shiotsu | G06K 7/0008 340/10.3 |
| 2013/0154799 | A1* | 6/2013 | Moran | G06K 7/0008 340/9.11 |
| 2015/0371693 | A1* | 12/2015 | Masleid | G11C 8/10 365/230.02 |
| 2016/0019404 | A1* | 1/2016 | Powell | G06K 7/10207 340/10.1 |
| 2016/0301422 | A1* | 10/2016 | Ahmed | H03M 5/145 |
| 2016/0301426 | A1* | 10/2016 | Ahmed | H03M 7/04 |

OTHER PUBLICATIONS

Ming-Kuei Yeh, et al.; "Silence Coding for RFID Tag Anti-collision"; 2016 IEEE 41st Conference on Local Computer Networks; Nov. 7-10, 2016; pp. 240-243; IEEE.

* cited by examiner

*Primary Examiner* — Tuyen K Vo
(74) *Attorney, Agent, or Firm* — Muncy, Geissler, Olds & Lowe, P.C.

(57) ABSTRACT

A fast RFID tag identifying method includes an encoding step for encoding a pair of bits to be expressed by an RFID tag into a silence code to be used in a transmitting step for the RFID tag. The silence code is arranged such that the superposition of a plurality of silence codes from a plurality of RFID tags is decoded into a set of pairs of bits to be expressed by the RFID tags.

5 Claims, 3 Drawing Sheets

FAST RFID TAG IDENTIFYING METHOD

BACKGROUND OF THE INVENTION

1. Field of the Invention

The present invention relates to the technical field of wireless communication and, more particularly, to a fast RFID tag identifying method.

2. Description of Related Art

The Radio Frequency Identification (RFID) technology belongs to the technical field of the wireless communication, in which an "RFID tag" (or "tag" for convenience hereinafter) is attached onto an object and, when the tag comes close to an "RFID reader" (or "reader" for convenience hereinafter), the reader can receive signals from the tag and read the unique tag ID stored in the tag. Typically, tags can be divided into active tags and passive tags. An active tag has a power source and is capable of actively emitting signals, while, a passive tag does not have a power source and it produces a signal in response to a signal transmitted from the reader by reflection, for example. The RFID technology is generally applicable to pre-paid cards, tickets, ID cards, patient case reports, tracking for animals or plants, logistics management, and so on.

However, the process of the prior art RFID technology is not satisfactory when there are a plurality of tags responding at the same time. In the process of the prior art, when a plurality of tags respond to the reader with their IDs at the same time, signals collide and the reader needs further processes to identify the tags one after another, thus delaying the identifying process. Therefore, the prior art RFID technology is desired to be improved.

SUMMARY OF THE INVENTION

In consideration of a plurality of RFID tags responding at the same time, one objective of the present invention is to provide a fast RFID tag identifying method, which includes an encoding step, a transmitting step, a receiving step, and a decoding step. The encoding step is to encode a tag ID bit pair into a silence code to be used in the transmitting step. The silence code is arranged such that the reader can perceive, in the receiving step, the superposition of silence codes transmitted by tags and decode it into a set of the ID bit pairs of the tags in the decoding step.

The present invention provides a fast RFID tag identifying method, comprising an encoding step for encoding a bit pair to be expressed by an RFID tag into a silent code to be used in a transmitting step for the RFID tag, wherein the silent code is arranged such that the superposition of a plurality of silent codes from a plurality of RFID tags is decoded into a set of bit pairs to be expressed by the RFID tags.

With the silence code of the present invention, it is still possible to perform decoding even if tags respond at the same time, causing signal collision. Therefore, in the face of signal collision among the plural tags, the reader can read ID bits of the plural tags at the same time, and thus the tag identifying process can be accelerated.

Other features and advantages of the present invention will become more apparent from the following detailed description when taken in conjunction with the accompanying drawings.

DETAILED DESCRIPTION OF THE PREFERRED EMBODIMENT

The present invention provides a fast RFID tag identifying method. The aforementioned method is mainly based on "silence codes" according to the present invention.

Figure 1:
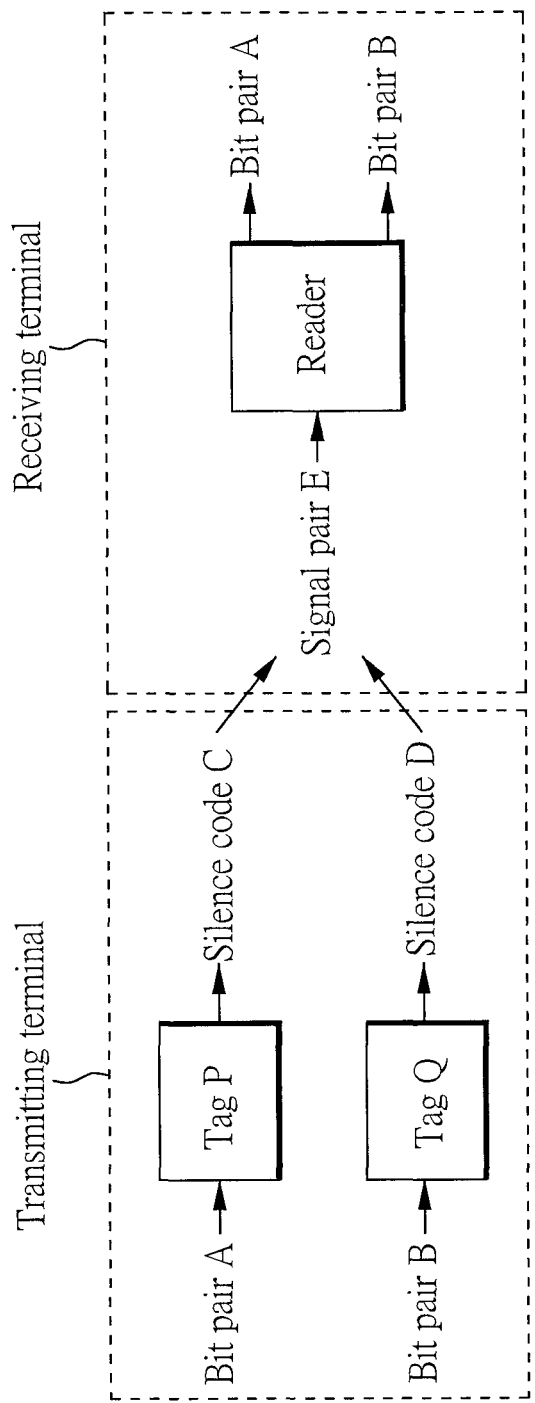
FIG. 1 is a block diagram showing the transmitting process for a tag and the receiving process for a reader according to the present invention.

FIG. 1 shows a block diagram showing the transmitting process of a tag and the receiving process of a reader according to the present invention.

As shown in FIG. 1, in a transmitting terminal, if a bit pair A is to be expressed by a tag P, the bit pair A must be encoded into a silence code C to be transmitted. During transmission, the silence code C may be superposed with another silence code D from another tag Q, and a signal pair E is then formed. In a receiving terminal, a reader receives the signal pair E, and it further decodes the signal pair E into a set of bit pairs (including exactly the bit pair A and the bit pair B).

Figure 2:
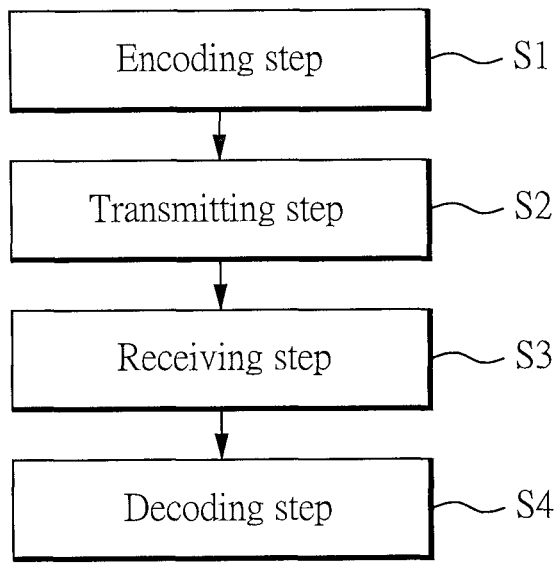
FIG. 2 is a flowchart showing a fast RFID tag identifying method according to the present invention.

FIG. 2 is a flowchart showing a fast RFID tag identifying method according to the present invention.

As shown in FIG. 2, step S1 is an encoding step, which is provided for a tag to encode a bit pair to be expressed by the tag into a silence code to be used in a transmitting step. It is noted that, the silence code according to the present invention is arranged such that the superposition of silence codes of tags is decoded into a set of bit pairs to be expressed by the tags. The arrangement of the silence codes, that is, the encoding and decoding of the silence codes, will be discussed hereinafter.

Step S2 is a transmitting step, which is provided for a tag to transmit the silence code. The present invention is for passive tags. A passive tag can only transmit a response wave passively after it receives an inquiry wave transmitted from a reader. During transmission, the silence code may remain unchanged, or may be superposed with another silence code transmitted from another tag and form a superposed silence code. The superposed silence code comes from the superposition of the electromagnetic signals of the silence codes. Step S3 is a receiving step, which is provided for a reader to receive the superposed or un-superposed silence code. Step S4 is a decoding step, which is provided for a reader to decode the superposed silence code into a set of bit pairs.

Figure 3:
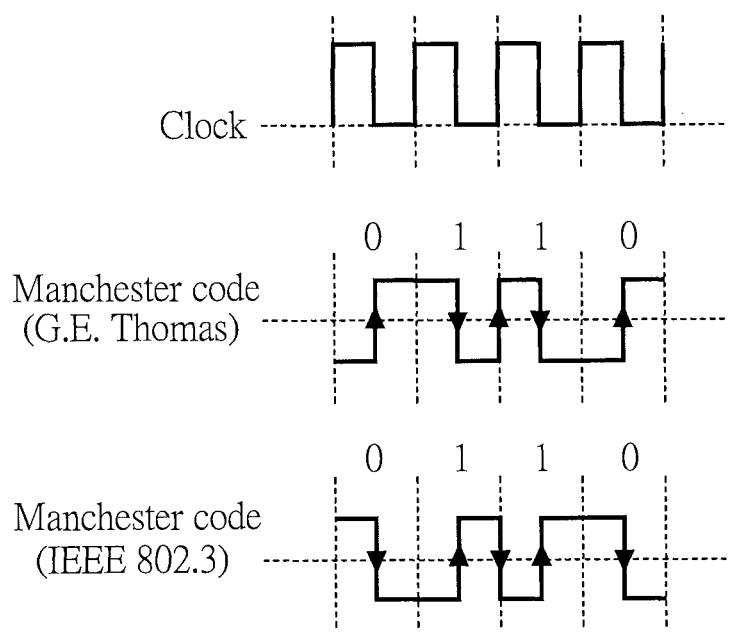
FIG. 3 shows signal forms of Manchester codes.

FIG. 3 shows signal forms of Manchester codes.

As shown in FIG. 3, signals in a form of a Manchester code are distinguished by voltage variations in a clock cycle. For a Manchester code according to G. E. Thomas convention, a signal with a voltage varying from low to high is defined as "signal 0", and a signal with a voltage varying from high to low is defined as "signal 1", while, for a Manchester code according to IEEE 802.3 convention, a signal with a voltage varying from high to low is defined as "signal 1", and a signal with a voltage varying from low to high is defined as "signal 0". However, both definitions can be used as a basis of the signal folios of the silence codes according to the present invention.

Figure 4:
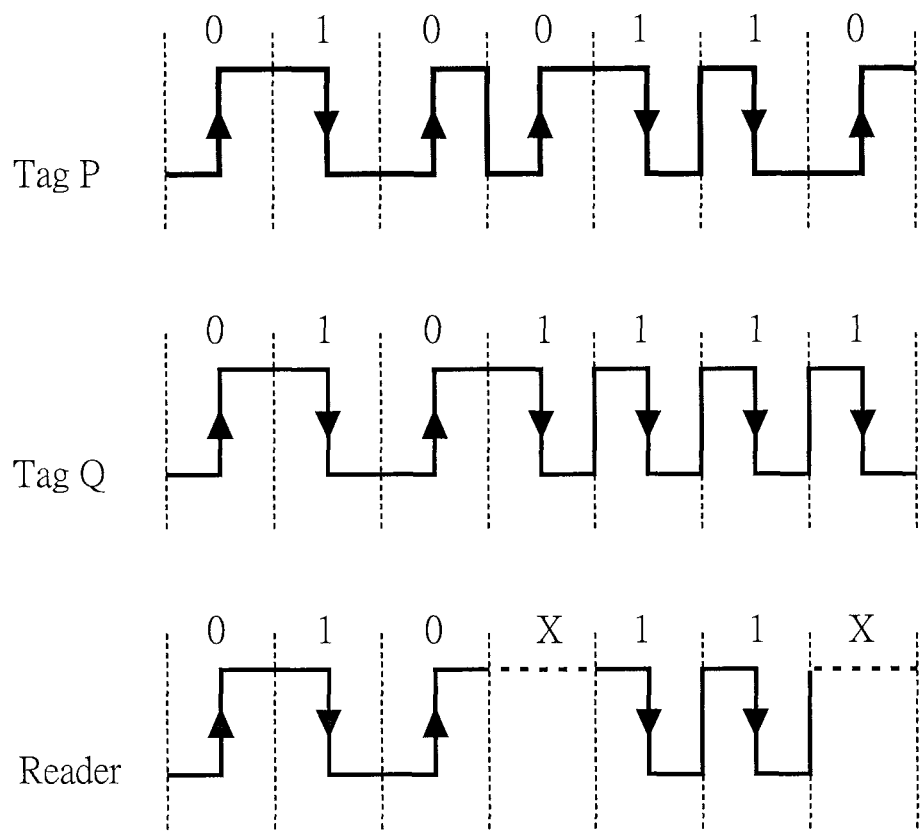
FIG. 4 shows signals received by a reader when there are two tags responding at the same time.

FIG. 4 shows signals received by a reader when there are two tags, the tag P and the tag Q, responding at the same time.

When signals from the two tags collide and turn into a signal X, in the prior art, the reader is unable to decode the signal X because there is no transition in the corresponding clock cycle, and further processes are needed to re-identify the two tags one after another, resulting in a process delay. In contrast, by encoding the signals into the silence codes according to the present invention, the reader is able to decode the signal X, so that the tag identifying process can be accelerated.

The encoding table of the silence codes according to the present invention is shown in TABLE 1.

TABLE 1

| Bit pairs | Silence codes |
|---|---|
| 00 | Ø0 |
| 01 | 0Ø |
| 10 | 1Ø |
| 11 | Ø1 |

In TABLE 1, the symbols "0" and "1" of the bit pairs are referred to as logic "0" and logic "1", respectively. While, the symbols "Ø", "0" and "1" of the silence codes are referred to as no signal, a low-to-high signal and a high-to-low signal, respectively.

As shown in TABLE 1, different bit pairs 00, 01, 10 and 11 correspond to different silence codes Ø0, 0Ø, 1Ø and Ø1, respectively, and each of the silence codes has two symbols. It is noted that each of the silence codes has one symbol Ø, which stands for no signal.

The encoding step can be achieved by looking up TABLE 1 and mapping a bit pair into a silence code.

The decoding table of the silence codes according to the present invention is shown in TABLE 2.

TABLE 2

| Signal pairs | Sets of bit pairs |
|---|---|
| ØØ | { } |
| Ø0 | {00} |
| 0Ø | {01} |
| 1Ø | {10} |
| Ø1 | {11} |
| 00 | {00, 01} |
| 10 | {00, 10} |
| ØX | {00, 11} |
| XØ | {01, 10} |
| 01 | {01, 11} |
| 11 | {10, 11} |
| X0 | {00, 01, 10} |
| 0X | {00, 01, 11} |
| 1X | {00, 10, 11} |
| X1 | {01, 10, 11} |
| XX | {00, 01, 10, 11} |

In TABLE 2, the symbols "Ø", "0", "1" and "X" of the signal pairs are referred to no signal, a low-to-high signal, a high-to-low signal and a signal collision, respectively. It is noted that TABLE 2 is derived on the basis of the superposition of the silence codes. As previously described with reference to FIG. 1, the silence code C may remain unchanged or may be superposed with another silence code D, and turn into the signal pair E. Accordingly, possible cases of signal pairs coming from unchanged silence codes or superposed silence codes are listed in TABLE 2. The rules for the superposition of silence codes are explained as follows: superposition of Ø and Ø turns into Ø, superposition of Ø and 0 turns into 0, superposition of Ø and 1 turns into 1, and superposition of 0 and 1 turns into X. Furthermore, the commutative property is valid for the aforementioned rules.

If a reader receives a signal pair ØØ, it can determine that no tag responds; in other words, the number of responding tags is 0. Obviously, no bit pair will be derived in this case, so the set of bit pairs is an empty set { }.

If the reader receives a signal pair Ø0, 0Ø, 1Ø or Ø1, it can determine that at least one tag responds. Since these four kinds of the signal pairs are exactly the typical silence codes as shown in TABLE 1, their corresponding sets of the bit pairs are {00}, {01}, {10} and {11}, respectively.

If the reader receives a signal pair 00, 10, ØX, XØ, 01 or 11, it can determine that at least two tags respond, and that the signal pair must come from the superposition of the silence codes. For example, a bit pair 00 to be expressed by a tag P is encoded as the silence code Ø0 according to TABLE 1, and a bit pair 01 to be expressed by a tag Q is encoded as the silence code 0Ø according to TABLE 1. When the tag P and the tag Q respond at the same time, the silence code Ø0 and the silence code 0Ø are superposed and turn into a superposed signal pair 00. Therefore, if the reader receives the superposed signal pair 00, it can determine that the superposed signal pair 00 comes from the superposition of the silence code Ø0 and the silence code 0Ø, and then derive the set of the bit pairs as {00, 01}.

The aforementioned process is also applied to superposed signal pairs 10, ØX, XØ, 01 and 11 to obtain that their corresponding sets of the bit pairs are {00, 10}, {00, 11}, {01, 10}, {01, 11} and {10, 11}, respectively.

If the reader receives a superposed signal pair X0, 0X, 1X or X1, it can determine that at least three tags respond, and that the signal pair must come from the superposition of the silence codes. For example, according to TABLE 1, a bit pair 00 to be expressed by a tag P is encoded as the silence code Ø0, a bit pair 01 to be expressed by a tag Q is encoded as the silence code 0Ø, and a bit pair 10 to be expressed by a tag R is encoded as the silence code 1Ø. When the tags P, Q, and R respond at the same time, the silence codes Ø0, 0Ø, and 1Ø are superposed and turn into a superposed signal pair X0. Therefore, if the reader receives the superposed signal pair X0, it can determine that the superposed signal pair X0 comes from the superposition of the silence codes Ø0, 0Ø and 1Ø, and then can derive the set of the bit pairs as {00, 01, 10}.

The aforementioned process is also applied to superposed signal pairs 0X, 1X and X1 to obtain that their corresponding sets of the bit pairs are {00, 01, 11}, {00, 10, 11} and {01, 10, 11}, respectively. If the reader receives a superposed signal pair XX, it can determine that at least four tags respond. The superposed signal pair XX is the superposition of the silence codes Ø0, 0Ø, 1Ø and Ø1, which correspond to the bit pairs 00, 01, 10 and 11, respectively, so the set of the bit pairs can be derived as {00, 01, 10, 11}.

So far, the process to obtain the encoding table as shown in TABLE 1 and the decoding table as shown in TABLE 2 of the silence codes according to the present invention has been discussed. It is to be understood that, TABLE 1 and TABLE 2 are only an exemplary embodiment. Based on the spirit of the present invention, various embodiments are possible by, for example, adjusting correspondence between the bit pairs and the silence codes, or increasing the number of bits and the number of the symbols of the silence codes, or introducing other kinds of signal forms to be the basis of the silence codes. It should be emphasized that, the silence codes according to the present invention is encoded such that they can be decoded even if signal collision occurs during transmission.

The decoding step can be achieved by looking up TABLE 2 and mapping a signal pair into a set of bit pairs.

In conclusion, with the silence codes according to the present invention, even if a plurality of tags respond at the same time to result in signal collision, the reader can still decode the tag ID pairs at the same time without further processing, so that the tag identifying process can be significantly accelerated.

Although the present invention has been explained in relation to its preferred embodiment, it is to be understood that combinations, modifications, or substitution or conversion can be made without departing from the spirit of the present invention. The scope of the present invention is not limited to the aforementioned embodiments, but is accorded to the claims hereafter.

What is claimed is:

1. A fast RFID tag identifying method, comprising:
    an encoding step for encoding a bit pair to be expressed by an RFID tag into a silent code to be used in a transmitting step for the RFID tag, wherein the silent code is arranged such that the superposition of a plurality of silent codes from a plurality of RFID tags is decoded into a set of bit pairs to be expressed by the RFID tags,
    wherein the encoding step is performed by the RFID tag itself;
    a signal form of the silent code is based on a Manchester code;
    types of the silent code include Ø, 0 and 1, in which Ø is representative of no signal, 0 is representative of a low-to-high signal, and 1 is representative of a high-to-low signal; and
    different bit pairs correspond to different silent codes, and each of the different silent codes has two symbols with one symbol being Ø.

2. The fast RFID tag identifying method as claimed in claim 1, wherein bit pairs 00, 01, 10 and 11 correspond to silent codes Ø0, 0Ø, 1Ø and Ø1, respectively.

3. The fast RFID tag identifying method as claimed in claim 1, wherein types of the superposition of silent codes include Ø, 0, 1 and X, in which Ø is representative of no signal, 0 is representative of a low-to-high signal, 1 is representative of a high-to-low signal, and X is representative of a signal collision.

4. The fast RFID tag identifying method as claimed in claim 3, wherein the superposition of silent codes ØØ, Ø0, 0Ø, 1Ø, Ø1, 00, 10, ØX, XØ, 01, 11, X0, 0X, 1X, X1 and XX correspond to sets of bit pairs { }, {00}, {01}, {10}, {11}, {00, 01}, {00, 10}, {00, 11}, {01, 10}, {01, 11}, {10, 11}, {00, 01, 10}, {00, 01, 11}, {00, 10, 11}, {01, 10, 11} and {00, 01, 10, 11}, respectively.

5. The fast RFID tag identifying method as claimed in claim 1, further comprising:
    the transmitting step for transmitting the silent code by the RFID tag, wherein, during transmission, the silent code is superposed with another silent code transmitted from another RFID tag and turns into a superposed silent code;
    a receiving step for receiving the superposed silent code by a reader; and
    a decoding step for decoding the superposed silent code into a set of bit pairs.

* * * * *